United States Patent
Shah et al.

(10) Patent No.: US 11,800,231 B2
(45) Date of Patent: Oct. 24, 2023

(54) HEAD-MOUNTED DISPLAY

(71) Applicant: Apple Inc., Cupertino, CA (US)

(72) Inventors: Ritu Shah, Mississauga (CA); Forrest C. Wang, Petaluma, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/011,376

(22) Filed: Sep. 3, 2020

(65) Prior Publication Data

US 2021/0092292 A1 Mar. 25, 2021

Related U.S. Application Data

(60) Provisional application No. 62/902,426, filed on Sep. 19, 2019.

(51) Int. Cl.
*H04N 23/698* (2023.01)
*H04N 23/54* (2023.01)
*H04N 23/57* (2023.01)
*H04N 23/90* (2023.01)

(52) U.S. Cl.
CPC ........... *H04N 23/698* (2023.01); *H04N 23/54* (2023.01); *H04N 23/57* (2023.01); *H04N 23/90* (2023.01)

(58) Field of Classification Search
CPC ............. H04N 5/23238; H04N 5/2253; H04N 5/2257; H04N 5/247
USPC .......................................................... 348/36
See application file for complete search history.

(56) References Cited

U.S. PATENT DOCUMENTS

| | | |
|---|---|---|
| 5,495,576 A | 2/1996 | Ritchey |
| 7,982,777 B2 | 7/2011 | Prechtl et al. |
| 9,649,558 B2 | 5/2017 | Stafford et al. |
| 10,009,542 B2 | 6/2018 | Billinghurst et al. |
| 10,217,189 B2 | 2/2019 | Russell |
| 10,244,226 B2 | 3/2019 | Weaver et al. |
| 2007/0046776 A1 | 3/2007 | Yamaguchi et al. |
| 2014/0375683 A1* | 12/2014 | Salter ................... G06T 19/006 345/633 |

(Continued)

FOREIGN PATENT DOCUMENTS

| | | |
|---|---|---|
| CN | 105659592 A | 6/2016 |
| CN | 206365527 U | 8/2017 |

(Continued)

OTHER PUBLICATIONS

Yang, H., "Stereoscopic spherical images in Oculus Rift", <https://sites.temple.edu/tudsc/2016/08/30/stereoscopic-spherical-images-in-oculus-rift/>, Aug. 30, 2016 (7 pp).

(Continued)

*Primary Examiner* — Matthew David Kim
(74) *Attorney, Agent, or Firm* — Young Basile Hanlon & MacFarlane, P.C.

(57) ABSTRACT

A head-mounted display includes a display unit, a head support, and cameras. The display unit includes a display for outputting graphical content. The head support is coupled to the display unit for engaging a head of a user to support the display unit with the display in front of an eye of the user. The cameras are each coupled to one of the display unit or the head support. The cameras have camera fields of view that overlap horizontally to cooperatively provide the head-mounted display with a head-mounted display field of view of 360 degrees horizontal.

22 Claims, 12 Drawing Sheets

(56) References Cited

U.S. PATENT DOCUMENTS

| | | | |
|---|---|---|---|
| 2015/0029350 A1* | 1/2015 | Matsuda | H04N 23/90 348/211.2 |
| 2016/0210785 A1* | 7/2016 | Balachandreswaran | G02B 27/0172 |
| 2016/0253561 A1* | 9/2016 | Foley | G01J 5/0265 348/158 |
| 2017/0255262 A1* | 9/2017 | Liu | G06F 3/015 |
| 2017/0295361 A1 | 10/2017 | Dashwood | |
| 2017/0337737 A1* | 11/2017 | Edwards | F16M 13/04 |
| 2017/0345197 A1* | 11/2017 | Sakai | G06T 11/60 |
| 2017/0372673 A1* | 12/2017 | Yeung | G09G 5/005 |
| 2018/0052329 A1* | 2/2018 | Shen | G06T 19/006 |
| 2018/0081520 A1* | 3/2018 | Han | G06F 3/013 |
| 2018/0164849 A1* | 6/2018 | Chan | G06F 3/16 |
| 2018/0190011 A1 | 7/2018 | Platt et al. | |
| 2018/0199029 A1* | 7/2018 | Van Der Auwera | H04N 13/161 |
| 2019/0004282 A1 | 1/2019 | Park et al. | |
| 2019/0215505 A1 | 7/2019 | Ishii et al. | |
| 2019/0221184 A1* | 7/2019 | Higuchi | G06T 19/00 |
| 2020/0366872 A1* | 11/2020 | Vettese | A42B 3/042 |

FOREIGN PATENT DOCUMENTS

| | | |
|---|---|---|
| CN | 107615759 A | 1/2018 |
| CN | 110168600 A | 8/2019 |

OTHER PUBLICATIONS

Instagram, Assembyl 3D Printing, "The GoPro VR Helmet Rig", https://www.instagram.com/p/BC1zwZNtXwH/, Mar. 12, 2016 (1 p).

Ardouin, J., et. al., "FlyVIZ: A Novel Display Device to Provide Humans with 360° Vision by Coupling Catadioptric Camera with HMD", Published 2012; Proceedings of the 18th ACM Symposium on Virtual Reality Software and Technology, ACM, New York, NY, USA, VRST '12, 41-44 (4 pp).

Rakkolainen, I., et. al., "Extreme Field-of-View for Head-Mounted Displays", Jun. 7, 2017 https://ieeexplore.ieee.org/xpl/conhome/8268897/proceeding, (4 pp).

* cited by examiner

HEAD-MOUNTED DISPLAY

CROSS-REFERENCE TO RELATED APPLICATION(S)

This application claims priority to and the benefit of U.S. Provisional Application No. 62/902,426 filed Sep. 19, 2019, the disclosure of which is incorporated by reference herein in its entirety.

TECHNICAL FIELD

This disclosure relates to head-mounted display and, in particular, head-mounted displays with cameras for observing the environment.

BACKGROUND

Head-mounted displays are computer devices worn on heads of users, which provide graphical content thereto, such as graphical content of a computer-generated reality (e.g., augmented reality; discussed in further detail below).

SUMMARY

Disclosed herein are implementations of head-mounted displays having cameras.

In one implementation, a head-mounted display includes a display unit, a head support, and cameras. The display unit includes a display for outputting graphical content. The head support is coupled to the display unit for engaging a head of a user to support the display unit with the display in front of an eye of the user. The cameras are each coupled to one of the display unit or the head support. The cameras have camera fields of view that overlap horizontally to cooperatively provide the head-mounted display with a head-mounted display field of view of 360 degrees horizontal.

The cameras may be positioned below a top of the head of the user. The head-mounted display field of view of 360 degrees horizontal may extend around the head of the user. One or more of the cameras may be a support-mounted camera that is coupled to the head support. The head support may extend around the head of the user. One or more of the cameras may be a display-mounted camera that is coupled to the display unit.

In an implementation, a head-mounted display includes a display unit, a head support, and cameras. The display unit includes a display. The head support is coupled to the display unit for engaging a head of a user to support the display unit with the display in front of an eye of the user. The cameras are each coupled to one of the display unit or the head support. The head-mounted display provides one of an optical passthrough or a forward-field video passthrough with a forward field of view that is a span of an environment visible to the user by the one of the optical passthrough or the forward-field video passthrough. The head-mounted display provides an extended-field video passthrough with the display with images of the environment captured by the cameras from an extended field of view that is outside the forward field of view.

In an implementation, a head-mounted display includes a display unit, a head support, and cameras. The display unit includes a display. The head support is coupled to the display unit for engaging a head of a user to support the display unit with the display in front of an eye of the user. The cameras are each coupled to one of the display unit or the head support. The cameras are each coupled to one of the display unit or the head support. The cameras have camera fields of view that overlap horizontally to cooperatively provide the head-mounted display with a head-mounted display field of view of 360 degrees horizontal. The head-mounted display stores 360-degree graphical content that includes images captured by the cameras from the head-mounted display field of view.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Disclosed herein are embodiments of head-mounted displays having several cameras, which may be used to generate graphical content, provide a video passthrough of the environment, and/or sense objects, people, or events in the environment.

Figure 1A:
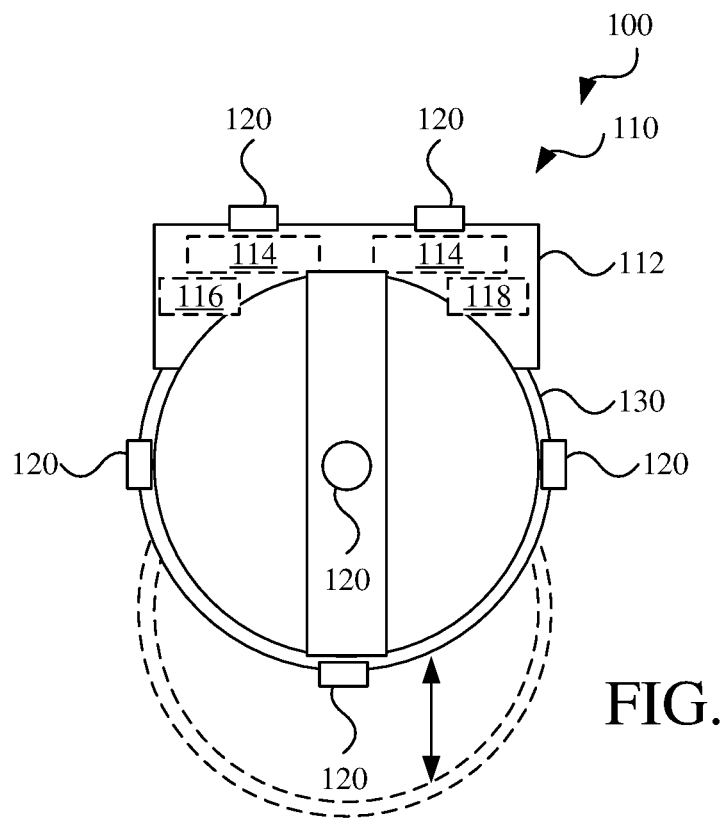
FIG. 1A is a top view of a head-mounted display.
Figure 1B:
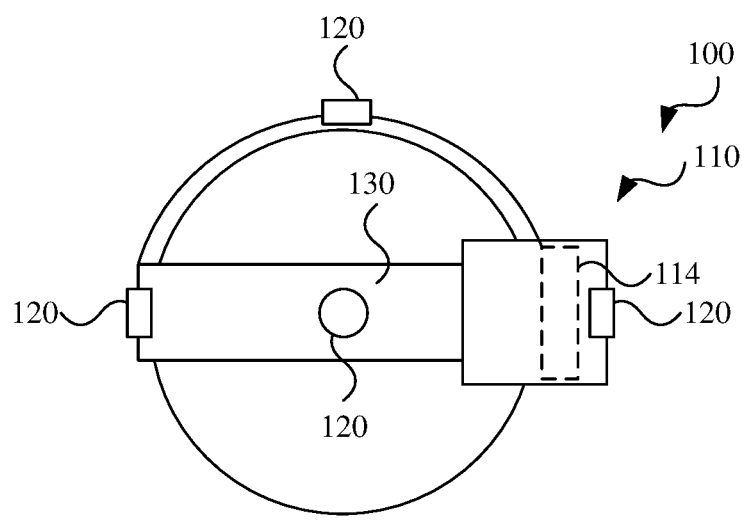
FIG. 1B is a side view of the head-mounted display of FIG. 1A.

Referring to FIGS. 1A and 1B, the head-mounted display 100 includes a display unit 110, cameras 120, and a head support 130. The display unit 110 is configured to be positioned in front of the eyes of the user and display graphical content thereto, while the head support 130 engages the head of the user to support the display unit 110 in a suitable position relative to the eyes of the user. The cameras 120 are coupled to the display unit 110 and/or the head support 130.

The display unit 110 generally includes a chassis 112, one or more displays 114 (e.g., two as shown), a controller 116, various other electronics 118, and one or more of the cameras 120. The chassis 112 is a generally rigid structure that is coupled to and supports the one or more displays 114 in front of the eyes of the user to display the graphical content thereto. The chassis 112, as shown, is configured as a housing (e.g., an enclosure) that contains the one or more displays 114 and covers the eyes of the user. The display unit 110 may further include a facial interface (not labeled) that is a compliant structure coupled to the chassis 112 for engaging the face of the user and supporting the display unit 110 thereof. The facial interface may fill gaps between the chassis 112 and the face of the user to prevent environmental light from reaching the eyes of the user and, thereby, be referred to as a light seal.

Each of the displays 114 is a display panel, such as a micro organic light-emitting diode display (microOLED), an organic light-emitting diode display (OLED), liquid crystal display (LCD), or other suitable display. The displays 114 may be considered to include one or more optical elements (not separately illustrated), such as lenses that refract light from the displays 114 to provide the graphical content to the user.

The displays 114 are positioned in front of the eyes of the user and inhibit (e.g., block) the view of the user of the physical environment therebehind. As discussed in further detail below, the head-mounted display 100 may provide a video passthrough of the physical environment with the displays 114. The video passthrough includes images of the physical environment, which are displayed to the user with the head-mounted display substantially contemporaneous with capture thereof by the cameras 120.

Figure 1C:
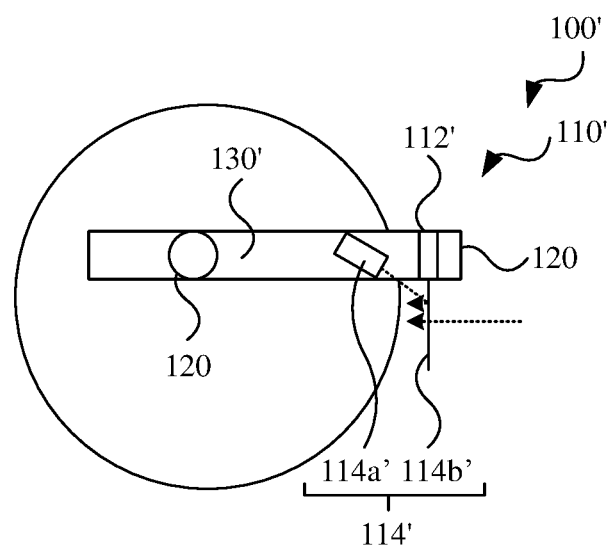
FIG. 1C is a side view of a variation of the head-mounted display of FIG. 1A.

Alternatively, as shown in FIG. 1C, a head-mounted display 100' is a variation of the head-mounted display 100 and is configured to provide an optical passthrough of the physical environment. Further details of the head-mounted display 100' are discussed in further detail below.

Figure 2:
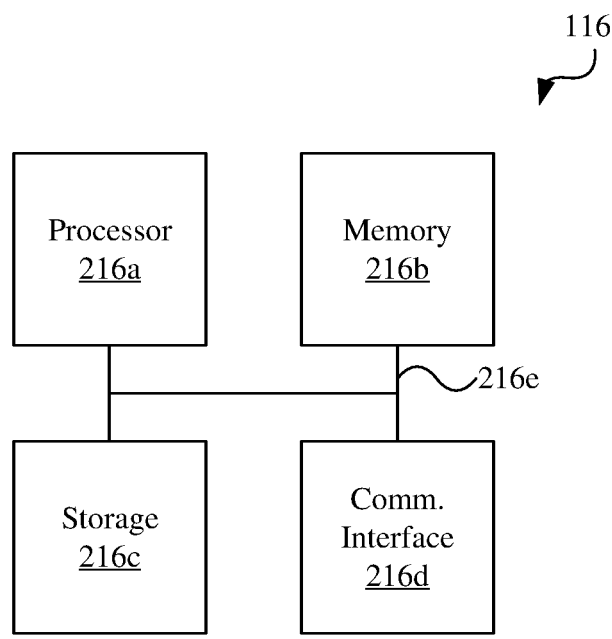
FIG. 2 is a schematic view of an example hardware configuration of a controller of the head-mounted display of FIG. 1A.

The controller 116 operates various components of the head-mounted display 100 and implements the various functionality and methods described herein. While the controller 116 is illustrated as contained in the chassis 112, the controller 116 may be provided remotely from the display unit 110, such as being in wired or wireless communication therewith. As shown in FIG. 2, the controller 116 generally includes a processor 216a, a memory 216b, a storage 216c, a communications interface 216d, and a bus 216e by which the other components of the controller 116 are in communication. The processor 216a may be any suitable processing device, such as a central processing unit (CPU). The memory 216b is a volatile, high speed electronic storage device, such as a random-access memory module (RAM) or other type of memory. The storage 216c is a non-volatile electronic storage device that, for example, includes software programming containing instructions that are implemented by the processor 216a to control various other components. The communications interface 216d allows various signals to be received by and sent from the sensor, such as sensor information or display signals for operating the displays 114. The bus 216e allows for communication between the various other components of the controller 116. The controller 116 should also be considered to include one or more additional controllers or processors, which may have dedicated purposes (e.g., an image signal processor).

Referring again to FIGS. 1A and 1B, the head-mounted display 100 includes various other electronics 118, which may include power electronics, sensors, and audio output devices. Power electronics, such as a battery, provided electrical power for other electronic components (e.g., the displays 114 and the controller 116). The sensors may be configured as one or more different types of sensors for monitoring different conditions, such as a thermometer for measure ambient temperature, motion sensors (e.g., accelerometers and/or GPS) for sensing position, orientation, and/or motion of the user and/or the head-mounted display, sound sensors (e.g., microphones) for sensing the voice of the user and/or environmental sound, and/or physiological sensors for sensing physiological conditions of the user (e.g., heart rate). The audio output devices, such as speakers or earphones, output sound.

The cameras 120 are of any suitable type for the applications and methods described herein. For example, each of the cameras 120 may include an image sensor and an optical element (e.g., a lens) that refracts and/or reflects light to the image sensor. The image sensor interprets light into image sensor signals and may, for example, be a complementary metal oxide semiconductor (CMOS) or charge-coupled device (CCD) sensor. The image sensor may detect light in a suitable spectrum (e.g., the visible light spectrum) and have a suitable resolution for the applications and uses described herein. As discussed in further detail below, the cameras 120 may be coupled to the display unit 110 and/or the head support 130. The cameras 120 are discussed in further detail below. In some applications, the cameras 120 may have different characteristics from each other. For example, the cameras 120 that provide video passthrough may be color cameras, while cameras used only for sensing the environment may be black and white cameras.

The head support 130 is coupled to the display unit 110 and engages the head of the user to support the display unit 110 thereon. As shown, the head support 130 is a band that extends around head of the user and may also extend over a top of the head of the user (as shown). The head support 130 may be removably coupled to the display unit 110, as indicated by the head support 130 in dashed lines in FIG. 1A, such that other head supports (e.g., of different sizes and/or functionality) may be coupled to the display unit 110. In some instances, the head support 130 may include electronic components (e.g., the cameras 120) or such electronic components may be removably coupled thereto. In such cases, the head support 130 forms a mechanical connection with the display unit 110 and also forms a data connection for transferring data between the cameras 120 and the display unit 110 and/or an electrical connection for transferring power between the head support 130 (e.g., the cameras 120 thereon) and the display unit 110. In the case of the head support 130 being removably coupleable to the display unit, a removable data connection, a removable electrical connection, and/or a removable mechanical connection are formed between the display unit 110 and the head support 130. Further details and variations of the head support 130 are discussed in further detail below.

Referring to FIG. 1C, the head-mounted display 100' provides the user with an optical passthrough of the physical environment, such that the physical environment is directly visible by the user (i.e., without output by the display 100'). A display unit 110' of the head-mounted display 100', includes a chassis 112' and one or more displays 114', along with the controller 116 (not shown), the various other electronics 118 (not shown), and the cameras 120 described previously. The chassis 112' is a generally rigid structure that is coupled to and supports the one or more displays 114' in front of the eyes of the user to display the graphical content thereto. The chassis 112' is configured as a frame (e.g., an open frame) that is coupled to and supports the displays 114. Unlike the chassis 112, the chassis 112' has a generally open structure that permits the user to view the physical environment substantially unobstructed (e.g., similar to glasses or goggles). For example, the chassis 112' may extend generally above the eyes of the user. The displays 114' may, as shown, include a projector 114a' and a reflector 114b' that reflects light emitted by the projector 114a' to provide graphical content to the eyes of the user. The projector 114a' may be any compact projector capable of emitting light with a suitable resolution for providing the graphical content. The reflector 114b' is both reflective to reflect the light from the projector 114a' and transparent to permit the user to observe the physical environment therethrough (i.e., provides an optical passthrough). The reflector 114b' may, for example, be a transparent glass or plastic component. A head support 130' is configured as elongated members (e.g., bows of glasses) that fit over the ears of the user, but may be configured as a strap as described previously for the head support 130.

Referring to FIGS. 3-8, variations of the head-mounted display 100 are discussed, including different mounting and functional configurations of the cameras. In the discussion and figures that follow, the cameras 120 of each of the different head-mounted displays 100 and variations thereof are identified with reference numerals having a "2" in the tens position and may be further identified as display-mounted cameras with a "2" in the ones position or support-mounted cameras with a "4" in the ones position (e.g., 322, 324, 422, 424, etc.). As referenced above, the head-mounted display 100 includes several of the cameras 120. Each of the cameras 120 has a field of view, which is a region of the environment that is viewable by the camera, and is referred to herein as a camera field of view. The camera fields of view are represented by dashed arrows emanating from the cameras 120.

Figure 3:
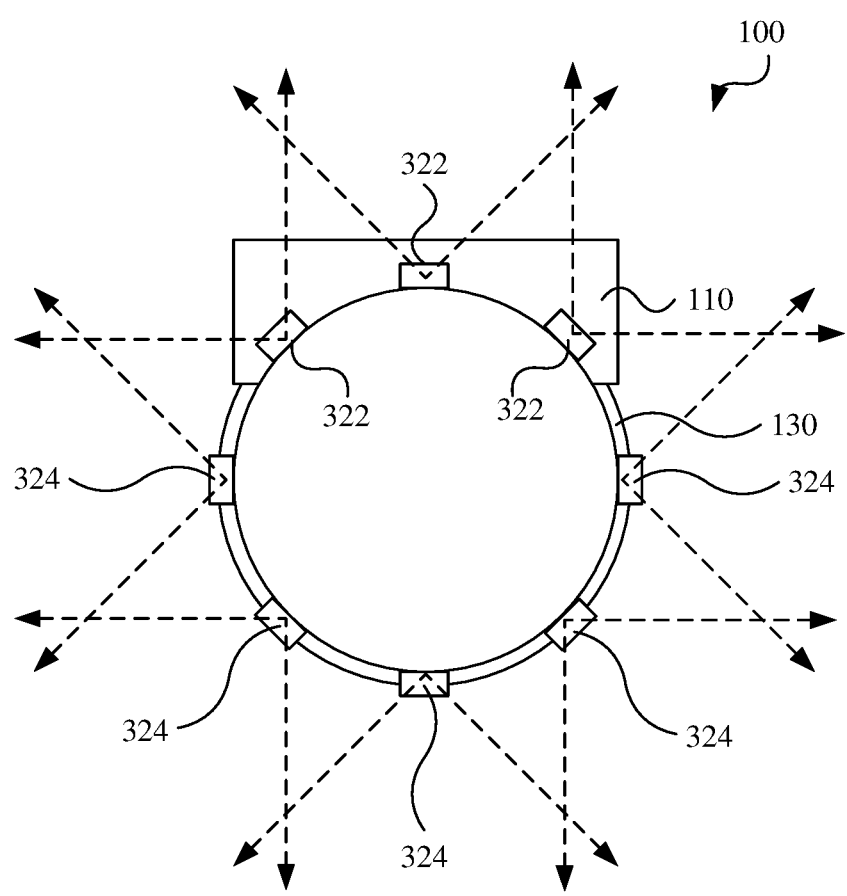
FIGS. 3-8 are top views of variations of the head-mounted display of FIG. 1A with different camera configurations.
Figure 4:
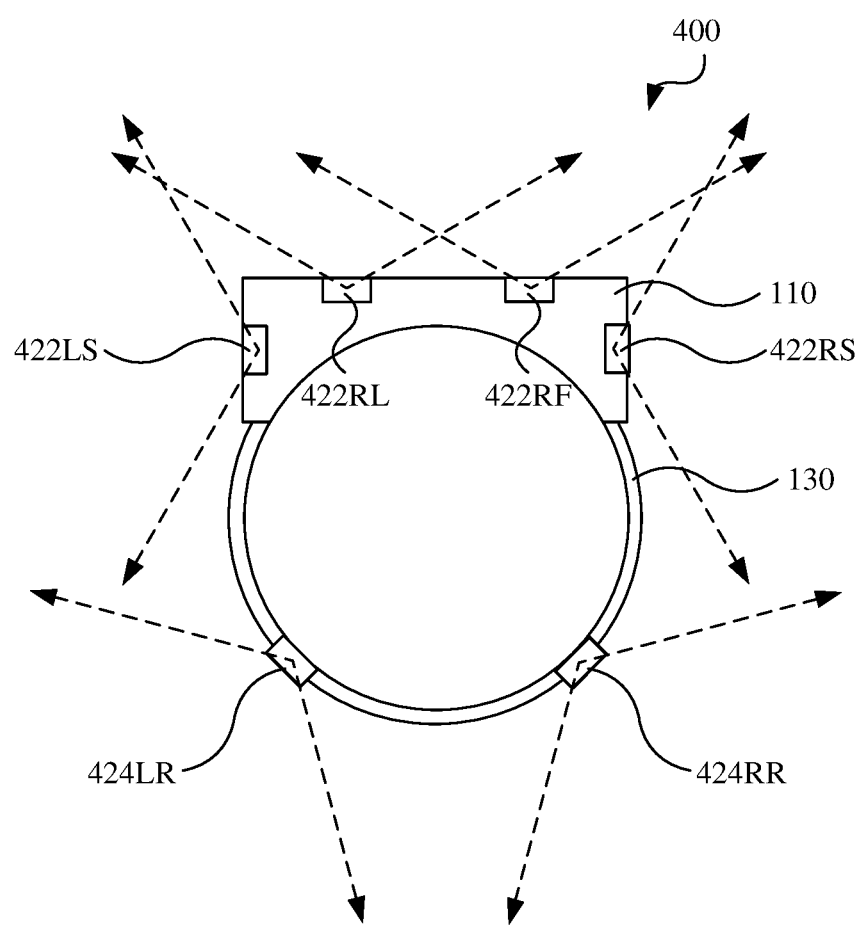
Figure 5:
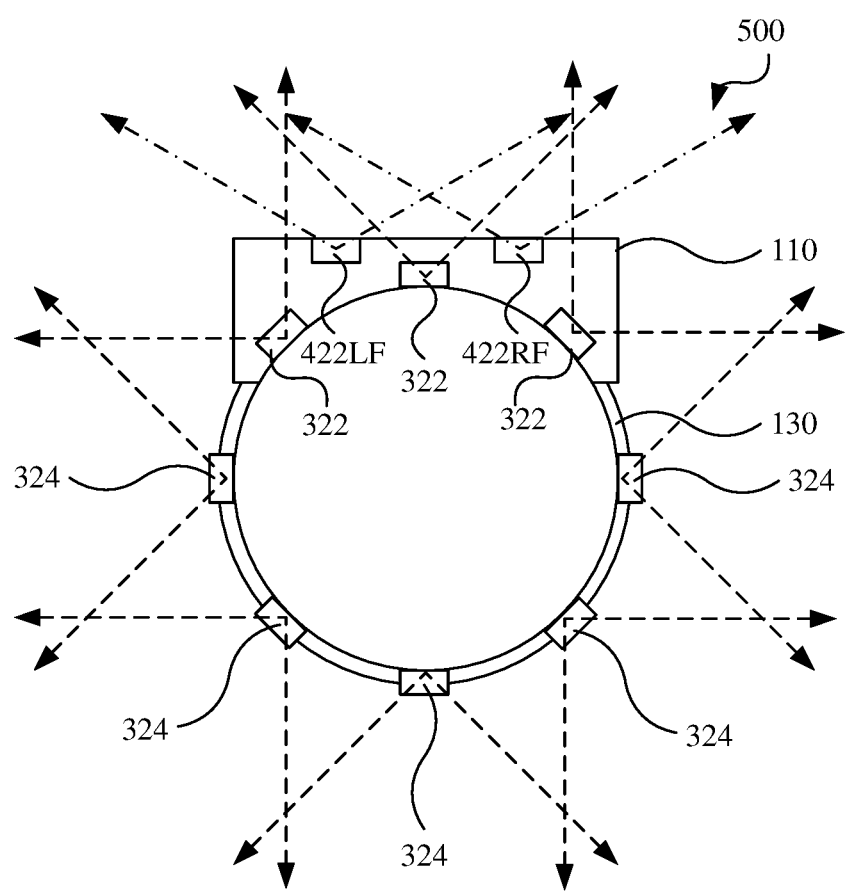

The camera fields of view of the cameras 120 overlap each other to cooperatively provide the head-mounted display 100 (or variations thereof) with a field of view that is referred to herein as an HMD field of view. As is shown in FIGS. 3-5, the camera fields of view of the cameras 120 (e.g., 322, 324, 422, 424) overlap each other horizontally entirely around the head-mounted display 100 and, thereby, around the head of the user, such that the HMD field of view is 360 degrees horizontal. The camera fields of view are omitted from FIGS. 6-8 for simplicity.

The cameras 120 are configured according to position, orientation, and camera field of view. The position of each of the cameras 120 refers to the position thereof relative to the head of the user and/or each other. The orientation of each of the cameras 120 refers to the direction in which the camera 120 faces (e.g., of an optical axis thereof), which may be measured relative to the head of the user and/or each other. The camera field of view of each of the cameras 120 may be characterized by horizontal and vertical angular ranges (e.g., a horizontal camera field of view).

The cameras 120 may be configured, in addition to their respective positions, orientations, and fields of view, according to number, mounting structure (i.e., the structure, such as the display unit 110 or the head support 130, to which the cameras are mounted), fixation (i.e., being fixed or movable in the position and/or orientation), removability (i.e., integration or removable coupling to the mounting structure), and/or camera characteristics (e.g., field of view, spectrum, or resolution, among others). To differentiate between the different ones of the cameras 120 in the description and the claims, each of the cameras 120 may be referred to with a different numerical identifier (e.g., first camera, second camera, etc.) and/or configurable characteristics or combinations thereof (e.g., position, orientation, mounting structure, fixation, removability, or other camera characteristic).

In the example shown in FIG. 3, the head-mounted display includes eight of the cameras 120. A first subset of the cameras 120 is coupled to the display unit 110 (e.g., three as shown), while a second subset of the cameras 120 is coupled to a head support 130 (e.g., five as shown). Those of the cameras 120 that are coupled to the display unit 110 (i.e., of the first subset) may be referred to as display-mounted cameras 322. Those of the cameras 120 that are coupled to the head support 130 (i.e., of the second subset) may be referred to as support-mounted cameras 324.

The cameras 322, 324 are positioned evenly around the head of the user (i.e., at 45-degree intervals), oriented to face outward the head of the user at 45 degrees relative to adjacent ones of the cameras 322, 324, and have horizontal camera fields of view of 90 degrees that are indicated by dashed arrows emanating therefrom. The horizontal camera field of view of each of the cameras 322, 324 overlaps the horizontal fields of view of each of the two cameras 322, 324 adjacent thereto, such that the cameras 322, 324 cooperatively provide the HMD field of view. As shown and referenced above, the camera fields of view of the cameras 322, 324 overlap each other horizontally entirely around the head-mounted display 100, such that the HMD field of view is 360 degrees horizontally. Those of the cameras 322, 324 that form the HMD field of view of 360 degrees horizontally may all be positioned below a top of the head of the user (e.g., within two inches of the height of the eyes of the user). Others of the cameras 120 (not shown; see FIGS. 1A and 1B) may face upward.

The cameras 120 may be integrated with (e.g., integrally coupled to) the head-mounted display 100. Being integrated or integrally coupled to is considered to allow for removal for repair or replacement of the cameras 120 but not repeated removal and recoupling by a user. The display-mounted cameras 322 are integrated with the display unit 110. The support-mounted cameras 324 are integrated with the head support 130.

As referenced above, the head support 130 is coupled to the display unit 110 with mechanical connections to support the display unit 110 and with electrical connections for power and/or data transfer therebetween (e.g., sending image signals from the cameras 120 to the controller 116). The head support 130 may be removably coupled to the display unit 110, so as to be interchangeable with other head supports having different characteristics (e.g., size and/or functionality).

The cameras 120 are in a substantially fixed relationship to each other. The chassis 112 of the display unit 110 is rigid, and the display-mounted cameras 322 are coupled to the chassis 112 at substantially fixed locations and orientations thereon. A portion of the head support 130 is rigid, such as a rigid outer portion, and the support-mounted cameras 324 are coupled to the rigid portion of the head support 130 in substantially fixed locations and orientations thereon. Another portion of the head support 130 that engages the head of the user may be compliant, such as a compliant inner portion, and conform to the shape of the head of the user for comfort and weight distribution purposes. Finally, the head support 130 is rigidly coupleable to the chassis 112 in a predetermined relationship, such that when the head support 130 is coupled to the display unit 110, the display-mounted cameras 322 and the support-mounted cameras 324 are in substantially fixed positions and orientations relative to each other. With the cameras 120 being substantially fixed in predetermined position and orientations relative to each other, cooperative processing of images captured thereby may be improved (e.g., performed with higher quality or more efficiently), for example, when stitching together the images captured by the cameras 120 to form combined images (as discussed below).

The term "substantially" in reference to the fixed positions and orientations includes small movement of the cameras 120 relative to each other, for example, as the chassis 112 flexes, the rigid portion of the head support 130 flexes, or the chassis 112 and the head support 130 move relative to each other. Such small movement of the cameras 120 relative to an adjacent one of the cameras 120 be, on average of all of the cameras 120, 10% or less, such as 5% or less of a relative dimension. For example, with eight of the cameras 120 being spaced and oriented evenly, adjacent ones of the cameras 120 are oriented with 45 degrees therebetween, 5% of which is 2.25 degrees.

Referring to FIG. 4, a head-mounted display 400 is a variation of the head-mounted display 100, which instead includes six of the cameras 120. The cameras 120 include display-mounted cameras 422 and support-mounted cameras 424. The display-mounted cameras 422 are integrated with the display unit 110 and include a left-front camera 422LF, a right-front camera 422RF, a left-side camera 422LS, and a right-side camera 422RS. The left-front camera 422LF and the right-front camera 422RF are spaced apart on a front side of the display unit 110 and oriented in a primarily forward-facing direction (e.g., with optical axes that parallel or approximately parallel, such as within 15, 10, or 5 degrees or less from parallel). The left-side camera 422LS and the right-side camera 422RS are positioned on opposite sides of the display unit 110 and are oriented in primarily sideward-facing directions (e.g., with optical axes that are oriented 45 degrees or more, such as 45, 60, 75, 90 degrees or more from the forward direction or the optical axes of the left-front camera 422LF or the right-front camera 422RF adjacent thereto). Each of the display-mounted cameras 422 has a camera field of view (indicated by the dashed-arrows emanating therefrom) that overlaps the camera field of view of the display-mounted cameras 422 adjacent thereto. For example, as shown, the display-mounted cameras have 120-degree horizontal camera fields of view with the front and side cameras being oriented at 90 degrees relative to each other.

The support-mounted cameras 424 are integrated with the head support 130 and include a left-rear camera 424LR and a right-rear camera 424RR. The left-rear camera 424LR and the right-rear camera 424RR are spaced apart on the head support 130 and oriented to have overlapping camera fields of view with each other and with the display-mounted camera 422 adjacent thereto. For example, as shown, the support-mounted cameras 424 have 120-degree horizontal fields of view and are oriented at 90 degrees relative to each other and at 45 degrees relative to the display-mounted cameras 422 adjacent thereto. As a result, camera fields of view of the display-mounted cameras 422 and the support-mounted cameras 424 overlap each other to cooperatively provide an HMD field of view of 360 degrees.

Referring to FIG. 5, a head-mounted display 500 is a variation of the previously-described head-mounted displays, which instead includes ten of the cameras 120 that are integrated and substantially fixed in the manners described previously. The cameras 120 include the display-mounted cameras 322, the support-mounted cameras 324, the left-front camera 422LF, and the right-front camera 422RF described previously. Different ones of the cameras 120 may be used for different purposes, such as the left-front camera 422LF and the right-front camera 422RF providing a forward-looking video passthrough (e.g., being in color and/or having greater resolution than the cameras 322, 324), and the cameras 322, 324 generating 360-degree graphical content (e.g., due to being evenly spaced) and/or providing extended video passthrough (e.g., looking sideways and/or rearward more than the forward-looking video passthrough).

Figure 6:
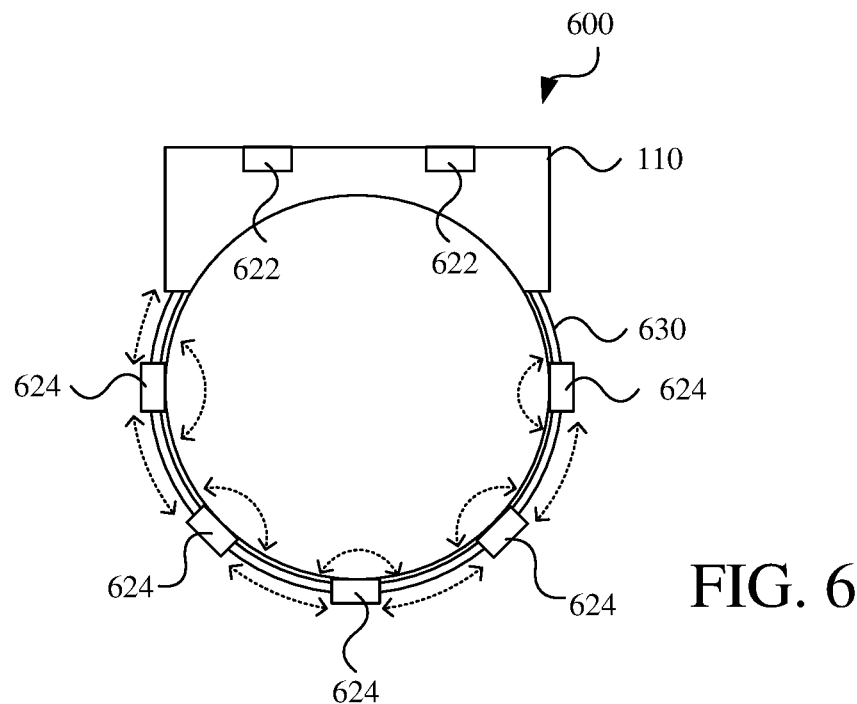

Referring to FIG. 6, a head-mounted display 600 is a variation of the head-mounted displays described previously, which includes display-mounted cameras 622 and support-mounted cameras 624. The display-mounted cameras 622 are integrated with the display unit 110 in substantially fixed positions and orientations, which may be the same or different from the display-mounted cameras 322, 422 (e.g., 422LF, 422RF, as shown). The support-mounted cameras 624 are coupled to a head support 630 that permits the support-mounted cameras 624 to move relative to each other, such that the relative positions and/or orientations thereof may change. For example, the head support 630 may be expandable, as indicated by the outer dashed arrows extending between the support-mounted cameras 624, which allows one or more of the support-mounted cameras 624 (e.g., all and independent of each other) to change position relative to each other and relative to the display unit 110 and the display-mounted cameras 622 thereon. Instead or additionally (as shown), the head support 630 may be flexible, such that one or more of the support-mounted cameras 624 (e.g., all and independent of each other) may change orientation relative to each other and relative to the display unit 110 and the display-mounted cameras 622 thereon, as indicated by the dashed arrows curved around each of the support-mounted cameras 624. With the support-mounted cameras 624 being movable relative to each other and to the display-mounted cameras 622, the support-mounted cameras 624 have sufficiently large camera fields of view that overlap each other and those of the display-mounted cameras 622 to account for such movement and provide the HMD field of view of 360 degrees.

The head support 630 may additionally include camera sensors (not shown) that are used to measure the positions and/or orientations of the support-mounted cameras 624 relative to each other and relative to the display unit 110 and the display-mounted cameras 622 thereon. Such measurements of the relative positions and/or orientation of the support-mounted cameras 624 may be used, for example, as an input in processing (e.g., stitching together) the images captured thereby, such as to form 360-degree graphical content.

Figure 7:
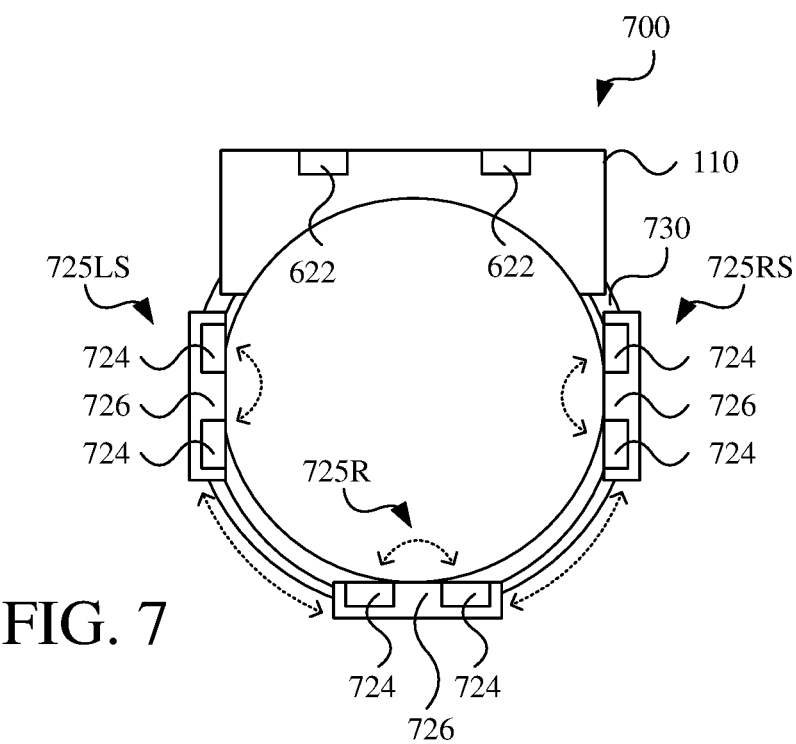

Referring to FIG. 7, a head-mounted display 700 is a variation of the head-mounted displays described previously, which includes the display-mounted cameras 622 that are integrated with the display unit 110 and support-mounted cameras 724 that are integrated with a head support 730. The support-mounted cameras 724 are arranged in one or more camera groups 725, such as a left-side camera group 725LS, a right-side camera group 725RS, and a rear camera group 725R. Each of the camera groups 725 includes two or more of the support-mounted cameras 724 in substantially fixed position and orientation with each other. For example, the two or more support-mounted cameras 724 in the camera group 725 are coupled to a rigid camera chassis 726 (e.g., plate). The support-mounted cameras 724 of each of the camera groups 725 may face outward with optical axes extending parallel to each other, which may be used to provide stereoscopic vision and/or triangulation to determine distances from the head-mounted display 700 to objects detected in the environment.

The head support 730 permits relative movement between the camera groups 725, such that the positions of the support-mounted cameras 724 and/or orientations thereof may change relative to those support-mounted cameras 724 of other groups and/or the display unit 110 and the display-mounted cameras 622 thereof. As with the head support 630, the head support 730 may be expandable such that the camera groups 725 (and the support mounted cameras thereof may change position relative to each other and relative to the display unit 110 and the display-mounted cameras 622 thereon. Instead or additionally (as shown), the head support 730 may be flexible, such that the camera groups 725 (and the support-mounted cameras 724 thereof) may change orientation relative to each other and relative to the display unit 110 and the display-mounted cameras 622 thereon. With the camera groups 725 of the support-mounted cameras 724 being movable relative to each other and to the display-mounted cameras 622, the support-mounted cameras 724 have sufficiently large camera fields of view that overlap each other and those of the display-mounted cameras 622 to account for such movement and provide an HMD field of view of 360 degrees.

The head support 730 may additionally include the camera sensors (not shown) that are used to measure the positions and/or orientations of the camera groups 725 and the support-mounted cameras 724 thereof relative to each other and relative to the display unit 110 and the display-mounted cameras 622 thereon. Such measurements of the relative positions and/or orientation may be used, for example, as an input in processing (e.g., stitching together) the images captured thereby, such as to form 360-degree graphical content.

While the head-mounted display 700 is discussed as having three camera groups 725 with two support-mounted cameras 724 each, the head-mounted display 700 may have fewer or more camera groups 725 (e.g., one, two, four, or more), and each camera group 725 may have more than two cameras (e.g. three, four, or more). Still further, the head-mounted display may include individual ones of the support-mounted cameras 724 and camera groups 725 in combination with each other.

Figure 8:
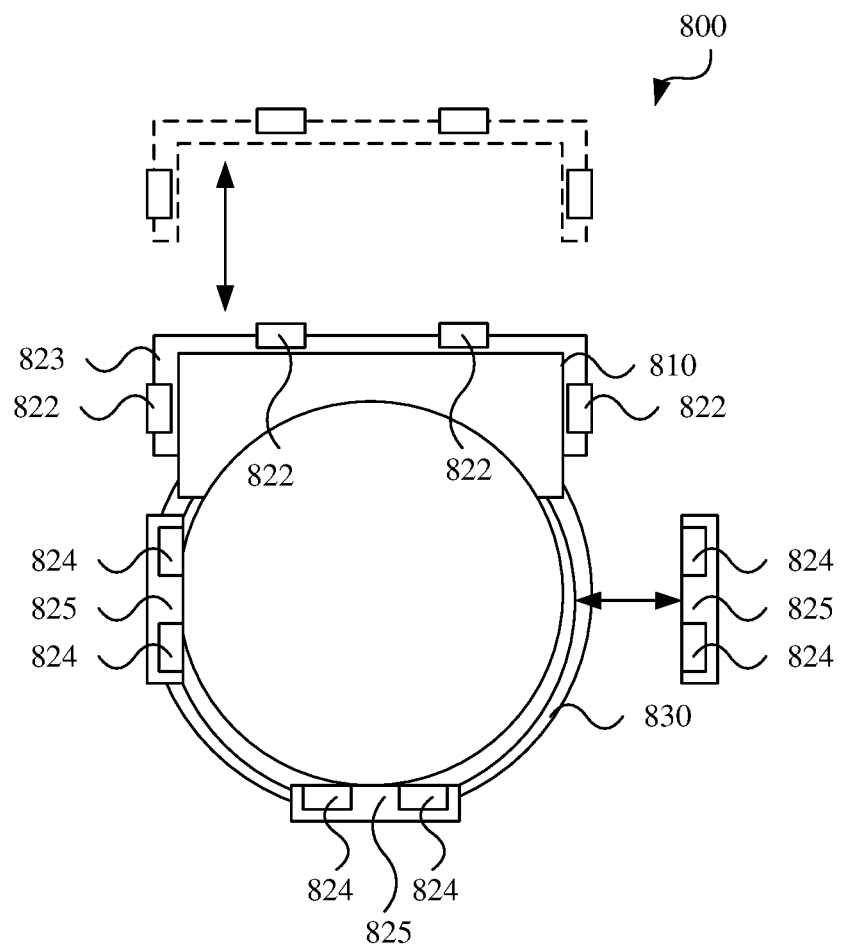

Referring to FIG. 8, a head-mounted display 800 is a variation of the head-mounted displays described previously, which includes cameras 120 that are removable therefrom. Instead of or in addition to any of the integrated cameras above, the head-mounted display 800 may include removable display-mounted cameras 822 and/or removable support-mounted cameras 824, which may be removably coupleable to a display unit 810 and a head support 830, respectively. The display unit 810 is a variation of the display unit 110, which further includes mechanical and electrical connections for mechanically and electrically coupling to the removable display-mounted cameras 822. The removable display-mounted cameras 822 may couple to the display unit 810 individually or may be provided as a removable camera group module (as shown) that includes two or more of the removable display-mounted cameras 822 (e.g., four as shown) coupled to a camera module chassis 823. When the camera module chassis 823 is mechanically coupled to the display unit 810, the removable display-mounted cameras 822 may be in substantially fixed positions and orientations (e.g., as with the display-mounted cameras 322 and/or 622) with overlapping camera fields of view.

The head support 830 is a variation of the head supports previously described, which further includes mechanical and electrical connections for mechanically and electrically coupling to the removable support-mounted cameras 824. The removable support-mounted cameras 824 may couple to the display unit 810 individually or may be provided as one or more removable camera group modules that includes two or more of the removable support-mounted cameras 824 (e.g., two each as shown) coupled to a camera module chassis 825. When the camera module chassis 825 are mechanically coupled to the head support 830, the removable support-mounted cameras 824 thereon may be movable (e.g., with the camera module chassis 825 and/or the head support 830 being expandable and/or flexible therebetween) or in substantially fixed positions relative to each other (e.g., with the camera module chassis 825 being rigid) and/or the display unit 810 and the removable display-mounted cameras 822. In the case of the removable support-mounted cameras 824 being movable relative to each other and/or the removable display-mounted cameras 822, the removable support-mounted cameras 824 have horizontal camera fields of view that overlap each other and those of the removable display-mounted cameras 822 sufficiently to account for such relative movement and provide an HMD field of view of 360 degrees.

Variations of the head-mounted displays 100, 100', 400, 500, 600, 700, 800 may include fewer or more of the cameras 120 sufficient to provide the extended field of view of 360 degrees (e.g., two, three, four, five, seven, nine, eleven, or more of the cameras 120). Furthermore any suitable combination of the display units 110, 810, the head supports 130, 130', 630, 730, 830, the cameras 120 (e.g., 322, 324, 422, 424, 522, 524, 622, 624, 724, 822, 824), the camera groups, or the camera group modules may be used in conjunction each other in a head-mounted display.

Figure 9A:
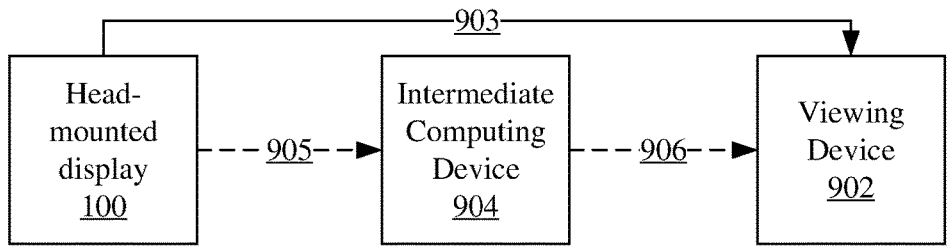
FIG. 9A is a diagram illustrating data transfer from the head-mounted display of FIG. 1A and variations thereof.
Figure 9B:
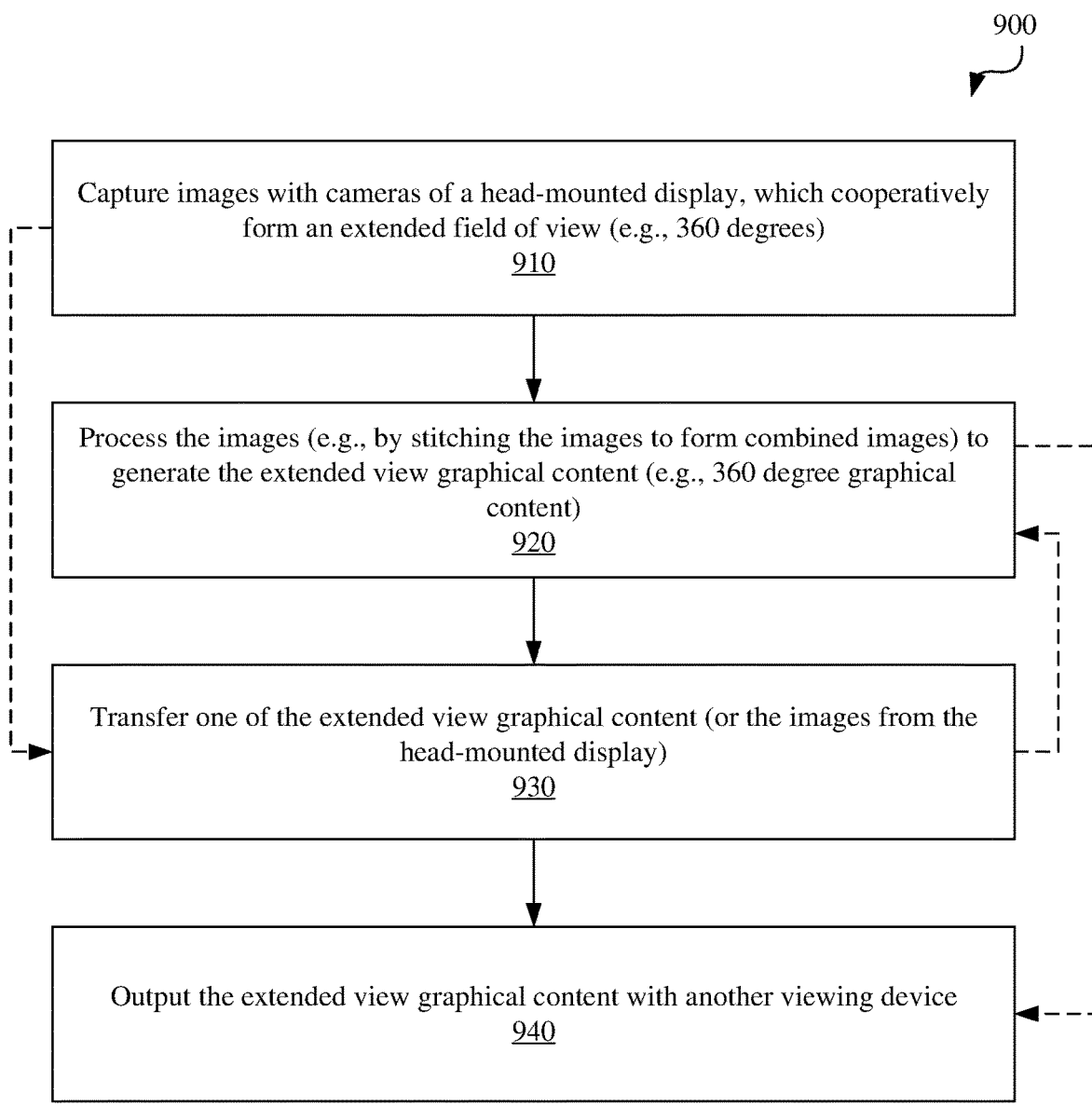
FIG. 9B is a flow diagram of a method of generating extended view graphical content with the head-mounted display of FIG. 1A and variations thereof.
Figure 10A:
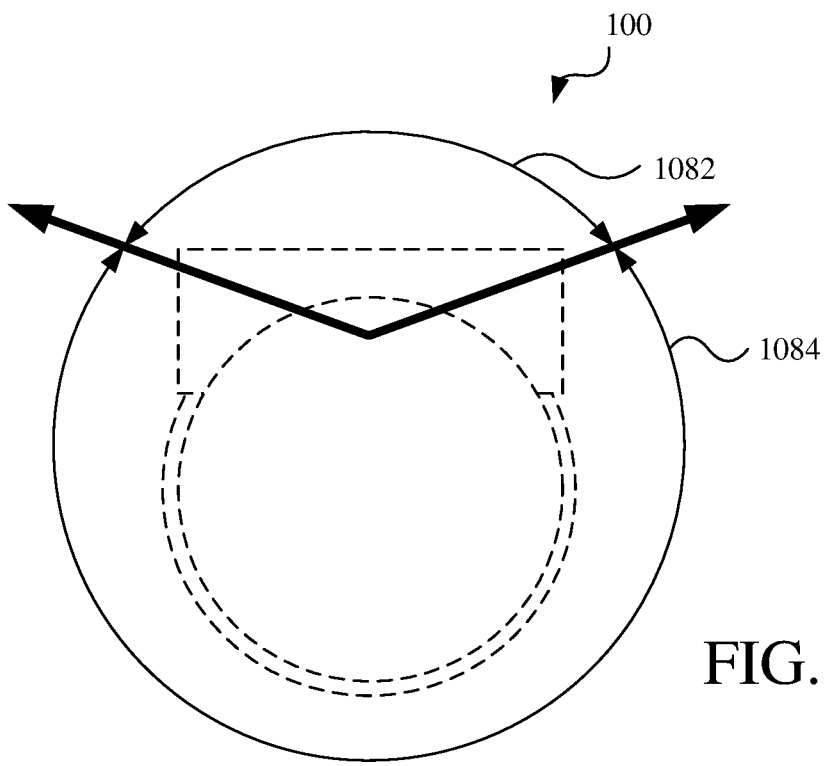
FIG. 10A is a top view illustrating a forward field of view and an extended field of view of the head-mounted display of FIG. 1A and variations thereof.
Figure 10B:
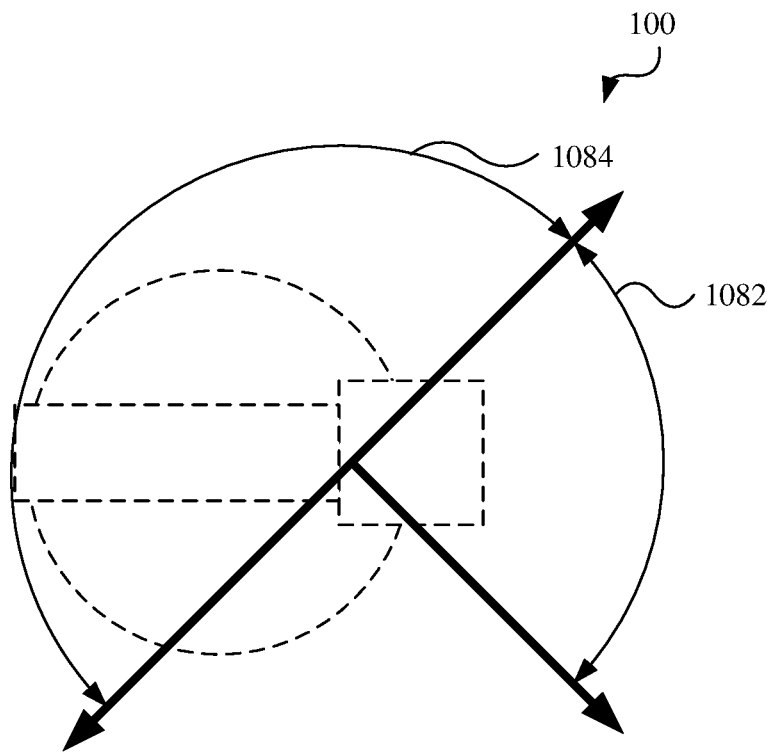
FIG. 10B is a side view illustrating the forward field of view and the extended field of view of the head-mounted display of FIG. 10A.
Figure 10C:
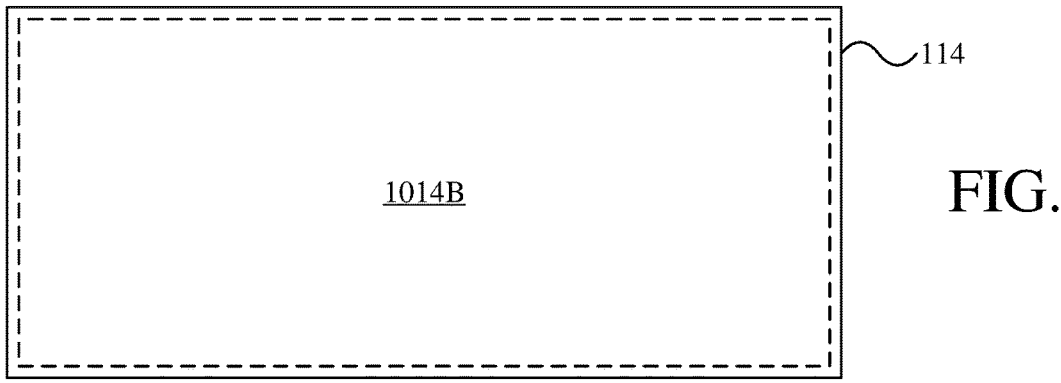
FIG. 10C-10F are rear views of a display of the head-mounted display of FIG. 1A and variations thereof outputting extended field graphical content.
Figure 10D:
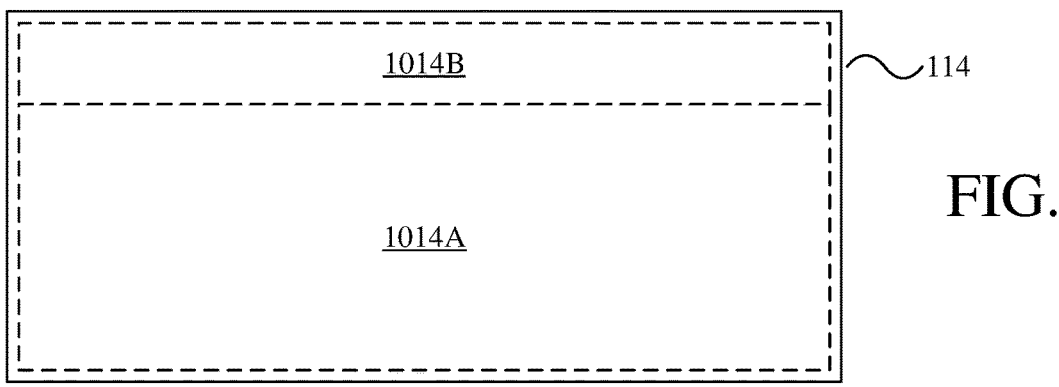
Figure 10E:
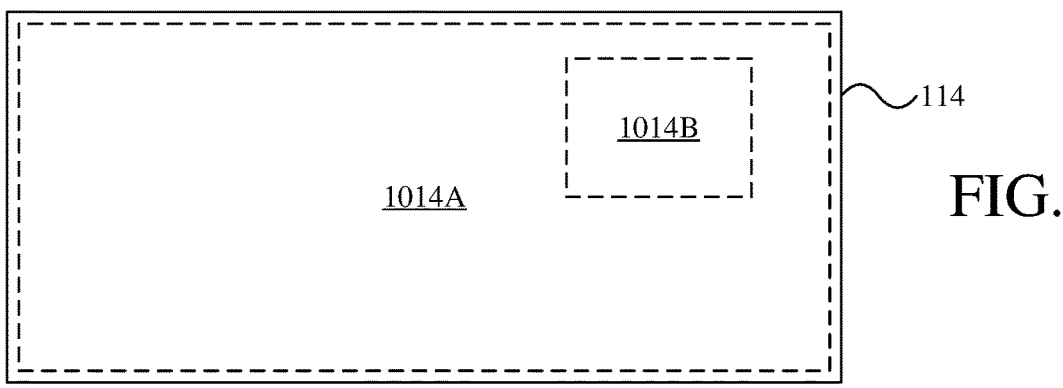
Figure 10F:
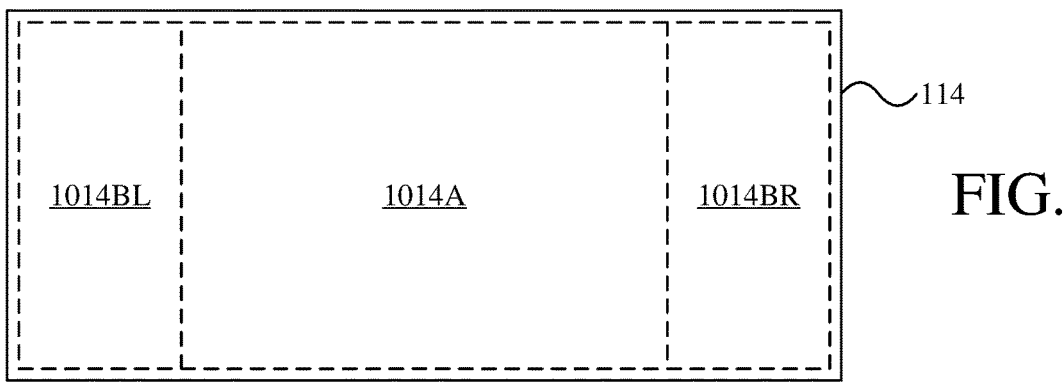
Figure 10G:
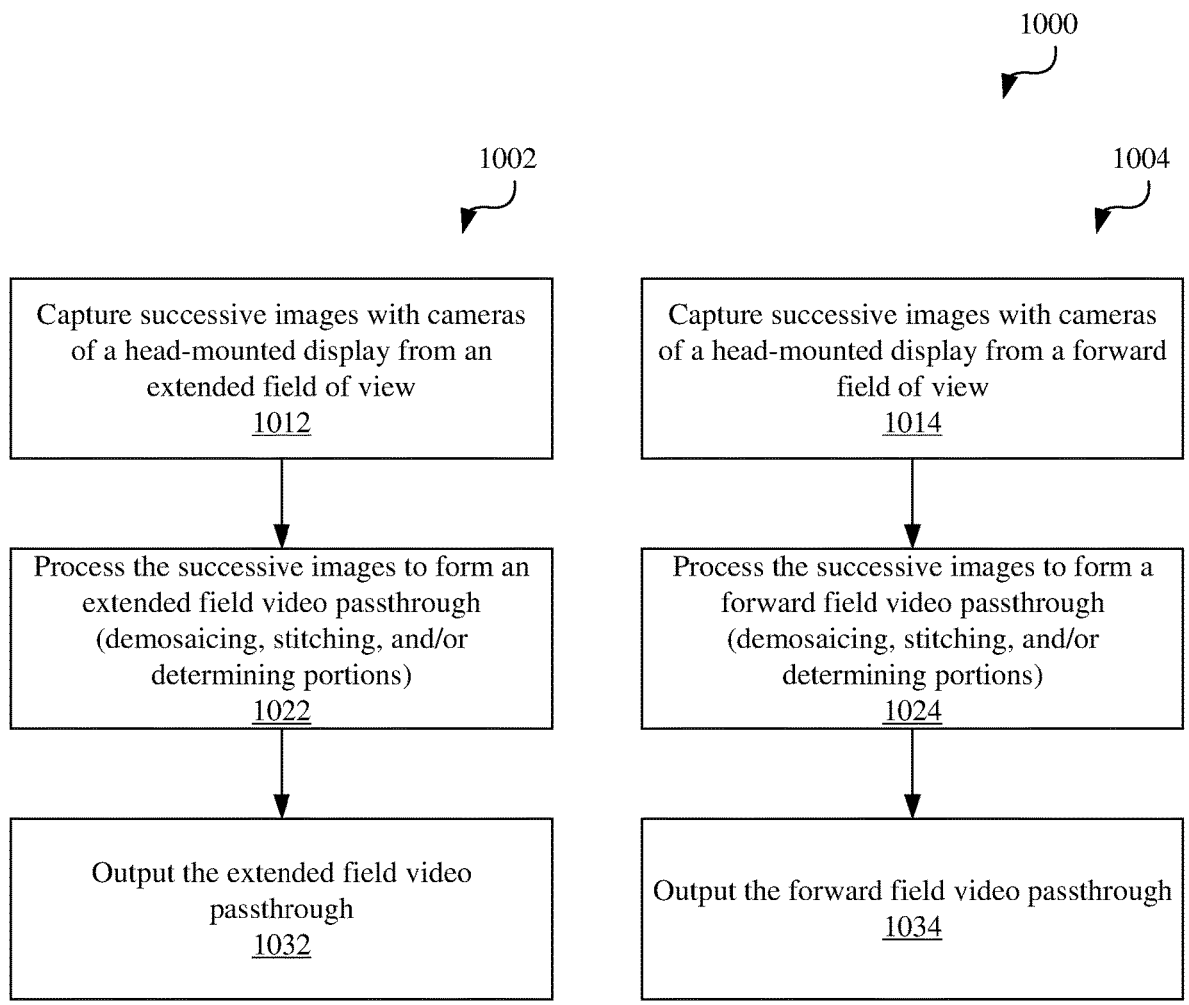
FIG. 10G is a flow diagram of a method of outputting extended-field graphical content with the head-mounted display of FIG. 1A and variations thereof.
Figure 11:
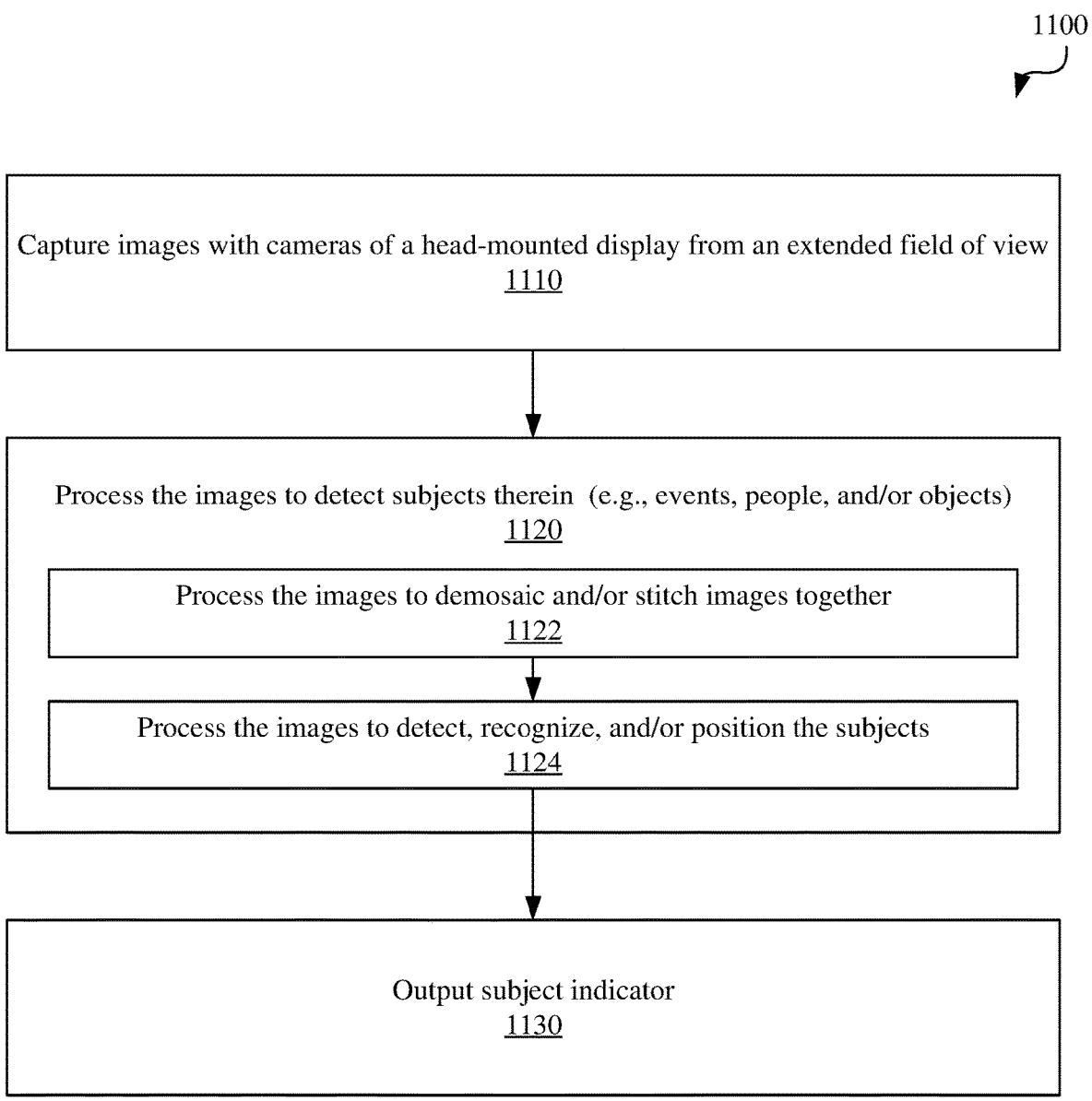
FIG. 11 is a method of sensing an environment with the head-mounted display of FIG. 1A and variations thereof.

Referring to FIGS. 9-11, the head-mounted display 100 and variations thereof (e.g., 100', 400, 500, 600, 700, 800, and variations thereof) may be used to generate 360-degree graphical content, provide a video passthrough, and/or sense subjects in the environment. For ease of reference, the uses and methods are discussed below with reference to the head-mounted display 100 but should be understood to apply to the other head-mounted displays 100', 400, 500, 600, 700, 800, unless otherwise indicated Referring to FIGS. 9A-9B, the head-mounted display 100 generates extended field graphical content. Extended field graphical content is formed from images captured simultaneously by the cameras 120 with overlapping camera fields of view. Extended field graphical content may be 360 degree-graphical content, which is generated from cameras having camera fields of view that overlap each other entirely around a central reference, such as the head-mounted display 100 and/or the head of the user. The extended field graphical content is generated by capturing images simultaneously with the cameras 120 of the head-mounted display 100, processing the images to generate combined images (i.e., the extended field graphical content), and transferring the images or the combined images from the head-mounted display 100. The extended field graphical content (e.g., the images or combined images captured by the cameras) is stored by the head-mounted display 100 (e.g., the storage 216c of the controller 116) and may be viewed with the head-mounted display 100 or other viewing devices 902, such as other head-mounted displays, personal computers, tablet computers, or phones.

Singular images are captured simultaneously by the cameras 120, which as described above, have cameras fields of view that overlap each other to form the HMD field of view (e.g., being 360 degrees horizontal). The images may be captured over time, as frames of a video.

The singular images are processed to generate combined images that form the extended field graphical content. More particularly, the singular images are processed individually (e.g., demosaicing) and stitched together using suitable algorithms to form a combined image or series of combined images that form the extended field graphical content (e.g., 360-degree images or 360-degree video). In regions where the fields of view of the singular images overlap, the combined image may include or be derived from image data from each of the singular images. The processing of the images may be performed by the head-mounted display 100, such as by the controller 116 or another processor thereof. Alternatively, the images may be transferred for the head-mounted display 100 to an intermediate computing device 904 (as represented by arrow 905) that then processes the images to form the extended field graphical content. The intermediate computing device 904 may be any suitable device (e.g., being configured similar to the controller 116) capable of processing the images to generate the extended field graphical content.

The extended field graphical content is transferred to the viewing device 902 for later display thereby. The extended field graphical content may be transferred to other viewing devices in any suitable manner (e.g., transferrable storage device, direct wired or wireless transfer, or indirect wired and/or wireless transfer, such as through a computing network). The extended field graphical content may be transferred from the head-mounted display 100, when generated thereby, directly or indirectly to the viewing device 902 (as indicated by the arrow 903). Alternatively, the extended field graphical content may be transferred from the intermediate computing device 904, when generated thereby, directly or indirectly to the viewing device 902 (as indicated by the arrow 906).

The extended field graphical content may then be output by the viewing device 902. The viewing device 902 includes a display and outputs a field of view that is smaller than that of the extended field graphical content, thus only a portion of the extended field graphical content is displayed at a given time. The user of the viewing device 902 may control the portion of the extended field graphical content that is displayed at a given time, for example, by providing a panning instruction (e.g., rotating one's head in the case of a head-mounted display).

Referring to FIG. 9B, a method 900 is provided for generating extended field graphical content with a head-mounted display. The method 900 generally includes capturing 910 images with cameras of a head-mounted display, processing 920 the images to generate the extended field graphical content (e.g., 360-degree graphical content), and transferring 930 either the images or the extended field graphical content from the head-mounted display. The method 900 may still further include outputting 940 the extended field graphical content with another viewing device.

The capturing 910 of the images is performed with cameras of the head-mounted display, such as the cameras 120 of the head-mounted display 100 or variations thereof. The cameras are operated by a controller, such as the controller 116, or another processor. The cameras have camera fields of view that overlap each other to cooperatively form the HMD field of view, which may be 360-degrees horizontally around the head of the user.

The processing 920 of the images to generate the extended field graphical content, includes processing the images individually (e.g., demosaicing) and stitching together those images that are captured contemporaneously with each other to generate a combined image or successive combined images (e.g., video). The processing 920 may be performed by the head-mounted display, such as by the controller (e.g., the controller 116) or other processing device thereof. The combined images form the extended field graphical content.

The transferring 930 is performed by the head-mounted display, such as by a communications interface thereof (e.g., for wired or wireless transfer of the extended field graphical content). The transferring 930 of the 360-degree graphical content is, for example, to another viewing device or to a storage device.

As indicated by the dashed lines in the flow chart of FIG. 9B, the transferring 930 may instead be performed prior to the processing 920. In such case, the transferring 930 is of the images captured during the capturing 910 to another computing device. The processing 920 of the images (e.g., stitching of images to form combined images) is then performed by the other computing device, such as the intermediate computing device 904, to generate the extended field graphical content.

The method 900 may also include the outputting 940 of the extended field graphical content with another viewing device. The outputting 940 may further be considered to include receiving the extended field graphical content with the other viewing device. The other viewing device 902 may, for example, be another head-mounted display, a tablet computer, or a phone. The extended field graphical content is output with a display thereof as operated by a controller or other processor thereof. The display field of view of the other viewing device may be less than the extended field of view of the graphical content in which case the user may provide inputs to the other device, such as by moving the other device, to change the portion of the extended field of view of the graphical content that is within the display field of view of the other viewing device.

Referring to FIGS. 10A-10G, the head-mounted display 100 provides a video passthrough of the environment in which the user is positioned. The video passthrough may be considered graphical content and includes images captured by the cameras 120 of the head-mounted display 100 and output by the display 114 substantially contemporaneously with capture by the cameras 120 (i.e., with low latency between capture and output of the images). As a result, the user may observe the environment substantially in real-time via the video passthrough. The video passthrough may be provided with the head-mounted display 100 (i.e., that provides no optical passthrough) or variations thereof, or the head-mounted display 100' that provides an optical passthrough.

Referring to FIGS. 10A-10F, in the case of the head-mounted display 100, the video passthrough includes both a forward-field video passthrough 1014A, which corresponds to a forward field of view 1082 of the head-mounted display 100, and an extended-field video passthrough 1014B, which is taken from an extended field of view 1084. FIGS. 10A and 10B illustrate forward field of view 1082 and the extended field of view 1084 in horizontal and vertical directions, respectively. FIGS. 10C-10F illustrate alternative ways in which the forward-field video passthrough 1014A and the extended-field video passthrough 1014B may be spatially arranged on the display 114.

Referring first to FIGS. 10A and 10B, the forward field of view 1082 is a span of the environment visible to the user with the forward-field video passthrough 1014A. For example, if the images displayed from in the forward-field video passthrough 1014A include the environment from a horizontal span of 135 degrees in front of the user, the forward field of view 1082 is 135 degrees horizontal. The forward field of view 1082 is oriented in a forward direction from the head-mounted display 100 and may be approximately equal to the field of view of a human (e.g., approximately 200 degrees horizontal by 135 degrees vertical) or smaller. For example, the forward field of view 1082 may be between approximately 90 degrees and 180 degrees horizontal or less (e.g., between 90 and 140 degrees, or between 90 and 160 degrees), such as 120 degrees or 135 degrees horizontal. The forward field of view 1082 may, instead or additionally, be between approximately 60 and 135 degrees vertical.

The forward field of view 1082 is provided using one or more forward-facing cameras of the head-mounted display 100. In one example, the head-mounted display 100 includes two forward-facing cameras that provide the forward field of view 1082 (i.e., left and right ones of the cameras 120, such as the left-front camera 422LF and the right-front camera 422RF described with respect to FIGS. 4 and 5) and two of the displays 114 (i.e., left and right displays, as shown in FIG. 1A). The forward-field video passthrough 1014A is output as images on the right one of the displays 114 that are captured from the right one of the cameras 120 but not the left one of the cameras 120 and on a left one of the displays 114 that are captured from the left one of the cameras 120 but not the right one of the cameras 120.

Still referring to FIGS. 10A and 10B, the extended-field video passthrough 1014B includes images, combined images, or portions therefrom from the extended field of view 1084. The extended-field video passthrough 1014B may, but need not, include images spanning the entirety of the extended field of view 1084. The extended field of view 1084 is a portion of the HMD field of view, which is outside the forward field of view 1082. For example, the HMD field of view may be 360 degrees horizontal of which 135 degrees forms the forward field of view 1082 and the remaining 225 degrees form the extended field of view 1084 (i.e., is outside the forward field of view 1082 of 135 degrees).

The extended field of view 1084 is provided by the cameras 120 of the head-mounted display 100 or variations thereof described above. The extended-field video passthrough 1014B is output as images on the one or more displays 114, which may include singular images from one of the cameras 120, combined images (i.e., images from multiple of the cameras 120 stitched together, as described above), or portions thereof.

As shown in FIGS. 10C-10F, the forward-field video passthrough 1014A and the extended-field video passthrough 1014B may be output by the displays 114 in different manners. For example, as shown in FIG. 10C, the extended-field video passthrough 1014B may be the only graphical content that is displayed. Alternatively, as shown in FIGS. 10D-10F, the graphical content may include both the extended-field video passthrough 1014B and the forward-field video passthrough 1014A. The forward-field video passthrough 1014A may form a majority (e.g., 60%, 75%, 80%, 90% or more) of the area of the display 114, while the extended-field video passthrough 1014B may form a minority thereof (e.g., 40%, 25%, 20%, 10% or less) thereof. In the example shown in FIG. 10D, the extended-field video passthrough 1014B is positioned spatially above the forward-field video passthrough 1014A (e.g., while spanning 90% or more of a width of the display 114), or may be positioned therebelow. In the example shown in FIG. 10E, the extended-field video passthrough 1014B is surrounded by the forward-field video passthrough 1014A (e.g., as a picture in picture). In the example shown in FIG. 10F, the extended-field video passthrough 1014B is provided left and/or right sides (both as shown) of the forward-field video passthrough 1014A.

The position of the extended-field video passthrough 1014B may be predetermined for the user or may be selected by the user according to user preferences.

Display of the extended-field video passthrough 1014B may occur in different manners. In one example, the extended-field video passthrough 1014B is displayed continuously. In another example, the extended-field video passthrough 1014B is displayed according to a user input (e.g., selection to turn on or off the extended-field video passthrough 1014B). In another example, the head-mounted display 100 provides a prompt to the user (e.g., a visual and/or audible prompt that is selectable by the user) in response to which the user may provide a user input to display or not the extended-field video passthrough 1014B. The prompt may be provided to the user according to various criteria, such as detection and/or recognition of an event (e.g., movement) or object (e.g., hazard or person) with the cameras 120 in the extended field of view 1084. In a still further example, the extended-field video passthrough 1014B is displayed in direct response to detection and/or recognition of an event or object in the extended field of view 1084.

In the case of the head-mounted display 100' that provides an optical passthrough having the forward field of view 1082, which is a span of the environment visible to the user and may be referred to as the optical field of view. The forward field of view 1082 or the optical field of view may, for example, be approximately 200 degrees horizontal by approximately 135 degrees vertical if not obstructed by the head-mounted display 100'. In such case, the extended field of view 1084 is outside the optical field of view of the user. The extended-field video passthrough 1014B may be provided by the head-mounted display 100' in any of the manners described above with respect to the FIGS. 10C-10F (e.g., occupying the entire display 114' as in FIG. 10C, at a top or bottom of the display 114' as in FIG. 10D, surrounded by other portions of the display 114' as in FIG. 10E, or at left and/or right sides of the display 114' as in FIG. 10F.

Referring to FIG. 10G, a method 1000 is provided for providing a video passthrough of an environment. The method 1000 generally includes a first submethod 1002 of providing an extended field video passthrough and may further include a second submethod 1004 of providing a forward field video passthrough. The first submethod 1002 generally includes capturing 1012 images of the environment from an extended field of view, 1022 processing the images to the extended field video passthrough, and outputting 1032 the extended field video passthrough. The second submethod 1004 generally includes capturing 1014 images of the environment from a forward field of view, 1024 processing the images to form the forward field video passthrough, and outputting 1034 the forward field video passthrough.

The capturing 1012 of the images is performed with one or more cameras, such as the cameras 120, as operated by a controller or processor, such as the controller 116. One or more of the cameras has a camera field of view that is in an extended field of view, such as the extended field of view 1084 (e.g., outside a forward field of view or an optical field of view of the user). The camera fields of view may overlap.

The processing 1022 of the images is performed by a controller or other processor, such as the controller 116. The controller processes successive images from a single camera or multiple cameras to generate graphical content suitable for display as the extended field video passthrough. Such processing may include demosaicing singular images, stitching singular images together to form combined images, and/or determining a subportion thereof that will be displayed as the extended field video passthrough.

The outputting 1032 of the extended field video passthrough includes displaying those images, combined images, or portions thereof that form the extended field video passthrough with one or more displays of the head-mounted display, such as the displays 114 of the head-mounted display 100, as operated by the controller or other processor. The outputting 1032 of the extended field video passthrough is performed contemporaneous (i.e., with low latency) to the capturing 1012 of the images. The outputting 1032 of the extended field graphical content may be performed without output of the forward field video passthrough (e.g., with an optical passthrough) and/or simultaneous with the forward field video passthrough (e.g., as provided in the second submethod 1004). The extended field video passthrough may be output by the display in any of the manners described above with respect to FIGS. 10C-10F, and may be performed continuously, in response to user inputs, and/or in response to sensing of events and/or objects in the extended field of view.

The method 1000 may also include a second submethod 1004 of providing the forward field video passthrough, which includes the capturing 1014, the processing 1024, and the outputting 1034. The capturing 1014 of the images of the environment is performed with one or more forward-facing cameras, such as the cameras 120 (e.g., the left-front camera 422LF and the right-front camera 422RF), as operated by a controller or processor, such as the controller 116. The one or more forward-facing cameras each have a field of view that extends forward from the head-mounted display. For example, one forward-facing camera may be associated with one eye of the user and/or display of the head-mounted display (e.g., having left and right cameras for output of the forward field video passthrough on left and right displays to left and right eyes, respectively).

The processing 1024 of the images is performed by a controller or other processor, such as the controller 116. The controller processes successive images from a single camera or multiple cameras to generate graphical content suitable for display as the forward view video passthrough. Such processing may include demosaicing of singular images and/or determining a subportion thereof that will be displayed as the extended field video passthrough. To reduce latency between the capturing 1014 of the images and the outputting 1034 of the forward field video passthrough, it may be advantageous to reduce and/or otherwise limit the processing of images that form the forward field graphical content (e.g., by not stitching such images).

The outputting 1034 of the forward field video passthrough includes displaying those images, combined images, or portions thereof that form the forward field video passthrough with one or more displays of the head-mounted display, such as the displays 114 of the head-mounted display 100, as operated by the controller or other processor. The outputting 1034 of the forward field video passthrough is performed contemporaneous (i.e., with low latency) to the capturing 1012 of the images. The outputting 1034 of the forward field video passthrough may be performed simultaneous with the outputting 1032 of the extended field video passthrough (e.g., as provided in the first submethod 1002). The forward field video passthrough may be output by the display 114 in any of the manners described above with respect to FIGS. 10C-10F. For example, the forward field video passthrough may be output over a greater area than the extended field video passthrough and/or with lower latency from the capturing of images that form the video passthrough.

It should be noted that the method 1000 may be performed in conjunction with the method 900. For example, the video passthrough that includes the extended-field video passthrough 1014B may be provided with generating the 360-degree graphical content, such as with the capturing 910, 1012, 1014 being performed as the same operation.

Referring to FIG. 11, the head-mounted display 100 or variations may use the cameras 120 for sensing in the extended field of view 1084, which may be outside the forward field of view 1082 if the forward-field video passthrough 1014A is provided (e.g., with the head-mounted display 100 and variations thereof) or outside the optical field of view if provided (e.g., with the head-mounted display 100' and variations thereof). For example, the head-mounted display 100 may be configured to detect and/or recognize environmental subjects (e.g., events, people, and/or objects in the environment) by processing images captured by the cameras 120 with the controller 116 or other processor. By detecting and/or recognizing the environmental subjects, the head-mounted display 100 may provide the user with greater spatial awareness, for example, by providing visual and/or audible alerts of the environmental subjects, providing the video passthrough of the environmental subjects, and/or providing prompts to the user to view such video passthrough of the environmental subject. For example, the extended-field video passthrough 1014B may be provided in response to detecting a subject in the extended field of view 1084.

A method 1100 is provided for sensing in an extended field of view of a head-mounted display. The method 1100 generally includes capturing 1110 images with cameras having an extended field of view, processing 1120 the images to detect subjects, and outputting 1130 a subject indicator. The processing 1120 of the images may include suboperations of image processing 1122 the images (e.g., demosaicing singular images and/or stitching the singular images to form combined images) and subject detecting 1124 within the processed images.

The capturing 1110 of the images is performed with one or more cameras, such as the cameras 120, as operated by a controller or processor, such as the controller 116. One or more of the cameras has a camera field of view that is in an extended field of view, such as the extended field of view 1084 (e.g., outside a forward field of view or an optical field of view of the user). The camera fields of view may overlap.

The processing 1120 of the images is performed with a controller or other processor, such as the controller 116. The images are processed to detect, recognize, and/or position subjects (e.g., events, people, and/or objects), for example, using computer vision or any other suitable algorithms or software.

The processing 1120 of the images may include the suboperations of the image processing 1122 and the subject detecting 1124. The image processing 1122 includes initial processing of the images, such as demosaicing singular images and stitching together singular images to form combined images. The subject detecting 1124 includes processing the images to identify events (e.g., actions or movements), people (e.g., humans), and/or objects (e.g., types objects, such as hazards) in the extended field of view. The subject detecting 1124 may further include identifying such subjects, for example, by characterizing the type of event, person, and/or object and/or by identifying the specific event, person, and/or object. The subject detecting 1124 may still further include determining the position and/or motion of the subject, for example, using triangulation when the subject is detected in images from multiple of the cameras.

The outputting 1130 of the subject indicator includes providing a graphical or audio indicator of a detected subject, for example, with a display, such as the display 114, as operated by a controller or other processor, such as the controller 116. The subject indicator may, for example, include providing the extended-field video passthrough 1014B.

It should be noted that the method 1100 may be performed in conjunction with the method 900 and/or the method 1000. For example, capturing 1110 may be performed as the same operations of the capturing 910, 1012, and/or 1014.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photo realistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources generate graphical content. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to generate graphical content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, generating graphical content, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, graphical content may be generated based on non-personal information data or a bare minimum amount of personal information, such as the content being requested by the device associated with a user, other non-personal information, or publicly available information.

What is claimed is:

1. A head-mounted display comprising:
a display unit having a display for outputting graphical content that includes a forward-field video passthrough;
a head support coupled to the display unit for engaging a head of a user to support the display unit with the display in front of an eye of the user; and
cameras that are each coupled to one of the display unit or the head support, wherein the cameras have camera fields of view that overlap horizontally to cooperatively provide the head-mounted display with a head-mounted display field of view of 360 degrees horizontal,
wherein the head-mounted display outputs an extended-field video passthrough in response to detection of an environmental subject by the camera fields of view in an extended field of view, the extended-field video passthrough is a portion of the head-mounted display field of view, the extended-field video passthrough shows the environmental subject, the extended-field video passthrough including images of the extended field of view that are captured substantially contemporaneously by the overlapping camera fields of view with display of the extended-field video passthrough, the extended-field video passthrough is displayed simultaneous with the graphical content, the graphical content forms a majority of an area of the display, and the extended-field video passthrough forms a minority of the area of the display.

2. The head-mounted display according to claim 1, wherein when the head-mounted display is worn on the head of the user, the cameras are positioned below a top of the head of the user;
wherein the head-mounted display field of view of 360 degrees horizontal extends around the head of the user;
wherein one or more of the cameras is a support-mounted camera that is coupled to the head support;
wherein the head support extends around the head of the user; and
wherein one or more of the cameras is a display-mounted camera that is coupled to the display unit.

3. The head-mounted display according to claim 1, wherein when the head-mounted display is worn on the head of the user, the cameras are positioned below a top of the head of the user.

4. The head-mounted display according to claim 3, wherein the head-mounted display field of view of 360 degrees horizontal extends around the head of the user.

5. The head-mounted display according to claim 1, wherein one or more of the cameras is a support-mounted camera that is coupled to and supported by the head support.

6. The head-mounted display according to claim 5, wherein the head support extends around the head of the user.

7. The head-mounted display according to claim 5, wherein the head support is removably coupleable to the display unit.

8. The head-mounted display according to claim 7, wherein the head support and the display unit form a removable data connection that transfers data between the support-mounted camera and the display unit.

9. The head-mounted display according to claim 5, wherein the support-mounted camera is integrated with the head support.

10. The head-mounted display according to claim 5, wherein the support-mounted camera is removably coupled to the head support.

11. The head-mounted display according to claim 5, wherein one or more of the cameras is a display-mounted camera that is coupled to and supported by the display unit.

12. The head-mounted display according to claim 11, wherein the display-mounted cameras are integrated with the display unit.

13. The head-mounted display according to claim 1, wherein the head-mounted display prompts the user to view the extended-field video passthrough of the environmental subject.

14. The head-mounted display according to claim 1, wherein the extended-field video passthrough is at least one of surrounded by the graphical content, positioned above or below the graphical content, or positioned to a side of the graphical content.

15. A head-mounted display comprising:
a display unit having a display;
a head support coupled to the display unit for engaging a head of a user to support the display unit with the display in front of an eye of the user; and
cameras that are each coupled to one of the display unit or the head support;
wherein the head-mounted display provides a forward-field video passthrough with a forward field of view, the forward field of view being a span of an environment visible to the user by the forward-field video passthrough;
wherein the head-mounted display provides an extended-field video passthrough with the display with images of a detected subject in the environment captured by the cameras with overlapping camera fields of view from an extended field of view that is outside the forward field of view; and
wherein the extended-field video passthrough is displayed simultaneous with the forward-field video passthrough, and
wherein the extended-field video passthrough is positioned above or below the forward-field video passthrough on the display of the display unit.

16. The head-mounted display according to claim 15, wherein the extended field of view is outside of a span of 200 degrees horizontal in the forward direction.

17. The head-mounted display according to claim 15, wherein the forward field of view is 160 degrees or less horizontal.

18. The head-mounted display according to claim 15, wherein the images of the extended-field video passthrough include one or more of singular images, combined images, or portions thereof captured by the cameras from the extended field of view.

19. A head-mounted display comprising:
a display unit having a display;
a head support coupled to the display unit for engaging a head of a user to support the display unit with the display in front of an eye of the user; and
cameras that are each coupled to one of the display unit or the head support, wherein the cameras have camera fields of view that overlap horizontally to cooperatively provide the head-mounted display with a head-mounted display field of view of 360 degrees horizontal, the head-mounted display field of view includes a forward field of view and an extended field of view that is outside the forward field of view; and wherein the head-mounted display unit generates extended field graphical content corresponding to the extended field of view from images captured simultaneously by two or more of the cameras with overlapping ones of the camera fields of view, the head-mounted display detects an environmental subject in the extended field of view, and the head-mounted display outputs an extended-field video passthrough that is displayed simultaneously with a forward-field video passthrough corresponding to the forward field of view, the extended-field video passthrough including a portion of the extended field graphical content that has a smaller field of view than the extended field graphical content and shows the environmental subject.

20. The head-mounted display according to claim 19, wherein the extended-field video passthrough is surrounded by the forward-field video passthrough.

21. The head-mounted display according to claim 19, wherein the extended-field video passthrough is positioned above or below the forward-field video passthrough.

22. The head-mounted display according to claim 19, wherein the extended-field video passthrough is positioned to a side of the forward-field video passthrough.

* * * * *